(12) United States Patent
Choy

(10) Patent No.: US 7,795,951 B2
(45) Date of Patent: Sep. 14, 2010

(54) HIGH-DYNAMIC RANGE LOW RIPPLE VOLTAGE MULTIPLIER

(75) Inventor: Jon S. Choy, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 17 days.

(21) Appl. No.: 11/948,005

(22) Filed: Nov. 30, 2007

(65) Prior Publication Data

US 2009/0140795 A1 Jun. 4, 2009

(51) Int. Cl.
 *G05F 1/10* (2006.01)
 *G05F 3/02* (2006.01)
(52) U.S. Cl. .................................. 327/536; 327/537
(58) Field of Classification Search .................. 327/536
 See application file for complete search history.

(56) References Cited

U.S. PATENT DOCUMENTS

| | | | |
|---|---|---|---|
| 6,486,728 B2 | 11/2002 | Kleveland | |
| 6,794,927 B2 | 9/2004 | Bedarida et al. | |
| 6,909,319 B2 * | 6/2005 | Wang et al. | 327/536 |
| 6,927,441 B2 | 8/2005 | Pappalardo et al. | |
| 7,046,076 B2 | 5/2006 | Daga et al. | |
| 7,064,600 B1 | 6/2006 | Ming et al. | |
| 7,116,155 B2 | 10/2006 | Pan | |
| 7,173,477 B1 | 2/2007 | Raghavan | |
| 7,176,747 B2 | 2/2007 | Lee et al. | |
| 7,215,181 B2 | 5/2007 | Hahn et al. | |
| 2007/0069801 A1* | 3/2007 | Ragone et al. | 327/536 |

OTHER PUBLICATIONS

Lee, Jae-Youl et al.; "A Regulated Charge Pump With Small Ripple Voltage and Fast Start-Up"; IEEE Journal of Solid State Circuits; Feb. 2006; pp. 425-432; vol. 41, No. 2; IEEE.
Cabrini, A. et al.; "High-efficiency regulator for on-chip charge pump voltage elevators"; Electronic Letters; Aug. 17, 2006; 2 pp; vol. 42, No. 17.
Pelliconi, Roberto et al.; "Power Efficient Charge Pump in Deep Submicron Standard CMOS Technology"; Proceedings of the 27th EuropeanSolid-State Circuits Conference; Sep. 18-21, 2001, pp. 73-76.

* cited by examiner

*Primary Examiner*—Lincoln Donovan
*Assistant Examiner*—Daniel Rojas
(74) *Attorney, Agent, or Firm*—Daniel D. Hill

(57) ABSTRACT

A voltage multiplier (10) including a first clocked multiplier stage (12) having an input and an output and a second clocked multiplier stage (14, 16) having an input and an output is provided. The voltage multiplier further includes an input level regulator (18) coupled to the input of the first multiplier stage. The voltage multiplier further includes a feedback bias control circuit (32) coupled to the input level regulator, wherein the feedback bias control circuit is further coupled to receive the output (50) of the second multiplier stage, and wherein the feedback bias control circuit generates a feedback signal (58) affecting an output of the input level regulator based on a comparison between a voltage proportional to a voltage at the output of the second clocked multiplier stage and a reference voltage.

19 Claims, 4 Drawing Sheets

HIGH-DYNAMIC RANGE LOW RIPPLE VOLTAGE MULTIPLIER

BACKGROUND

1. Field

This disclosure relates generally to integrated circuits, and more specifically, to high dynamic range low ripple voltage multipliers.

2. Related Art

Flash memory devices require many different internal voltages to be generated within the memory device. Some voltages comprise voltages less than the supply voltage, also referred to as sub-supply voltages, and are generated, for example, by linear regulators. Other voltages are greater than the supply voltage and are generated by charge pumps (also referred to as voltage multipliers). However, an undesirable large number of components are required as a result of the providing many different internal voltages with the corresponding regulators and pumps. In addition, impedance degradation is a problem that occurs with charge pumps operated over a large output voltage range. Furthermore, undesirable voltage ripple is produced via linear regulators for generating sub-supply voltages.

Accordingly, there is a need for an improved method and apparatus for overcoming the problems in the art as discussed above.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

The voltage multiplier according to the embodiments of the present disclosure is advantageously suited to meet a number of voltage generation needs within an integrated circuit. While most multiplier circuits generate a multiplier factor of greater than one (i.e., >1), the voltage multiplier according to the embodiments of the present disclosure advantageously enables generation by the same voltage multiplier of (i) a multiplier of less than one (i.e., <1, for example (0.5)) and a multiplier of greater that one (i.e., >1). In one embodiment, the voltage multiplier is capable of a multiplier range from less than one to more than one by a multiplier factor of three (3×). As a result, one voltage generator supplies many different voltages and loads for a given integrated circuit, for example, one or more types of FLASH memory devices.

In addition, the voltage multiplier circuit according to the embodiments of the present disclosure enables generation of a wide range of voltages with relatively small ripple. Previous known circuits for generating voltages that are below the supply are generally generated by down regulating the supply voltage through a linear regulator. The voltage multiplier of the present disclosure solves the problem in a new way by controlling the generated voltage amplitude, and as a result the current that goes through the pumping capacitors is regulated. The embodiments of the present disclosure advantageously provide a voltage multiplier with high dynamic range, low ripple voltage, and an elevator charge pump.

Figure 1:
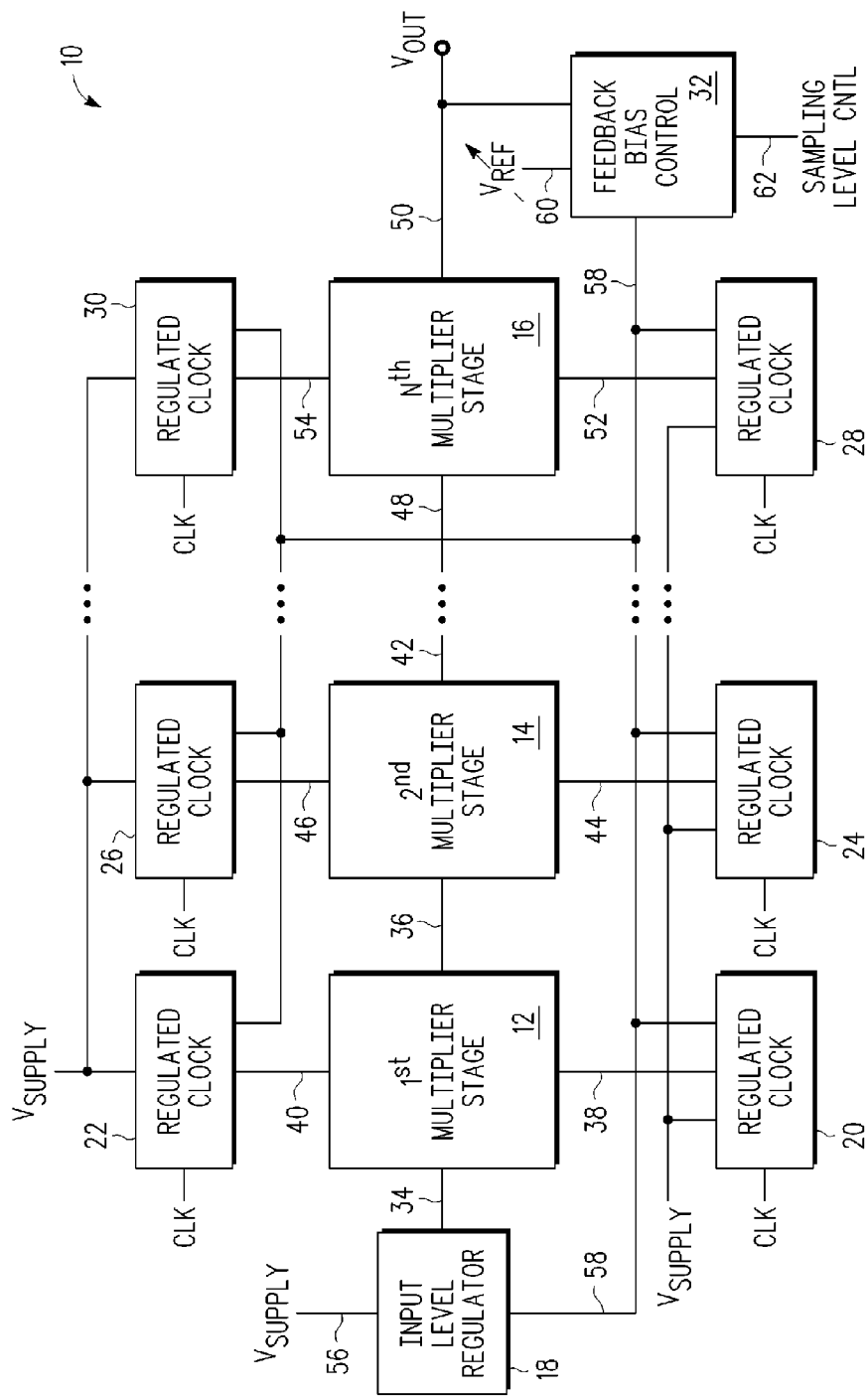
FIG. 1 is a block diagram view of a high dynamic range low ripple voltage multiplier according to one embodiment of the present disclosure.

FIG. 1 is a block diagram view of a high dynamic range low ripple voltage multiplier 10 according to one embodiment of the present disclosure. Voltage multiplier 10 includes a number of multiplier stages, designated by reference numerals 12, 14, and 16. Voltage multiplier 10 also includes an input level regulator 18, a number of regulated clock circuits 20, 22, 24, 26, 28, and 30, and a feedback bias control circuit 32.

Reference numerals 12 and 14 indicate first and second voltage multiplier stages, respectively. Reference numeral 16 indicates an $N^{th}$ multiplier stage, where N is an integer. As illustrated, the second multiplier stage 14 is separated from the $N^{th}$ multiplier stage 16 by a series of dots ". . . " that are indicative of one or more multiplier stages which may be present between the two illustrated stages. Note that while only three (3) multiplier stages are illustrated in FIG. 1, the number of multiplier stages is determined according to the requirements of a given voltage multiplier application. In one embodiment, the multiplier stages comprise symmetrical multiplier stages. In a further embodiment, the multiplier stages comprise identical multiplier stages. Still further, in another embodiment, the multiplier stages can comprise non-identical multiplier stages. Furthermore, the voltage multiplier stages can comprise one of (i) positive voltage multiplier stages for multiplying positive voltages and (ii) negative voltage multiplier stages for multiplying negative voltages.

The first multiplier stage 12 includes an input 34 and an output 36. In one embodiment, first multiplier stage 12 comprises a symmetrical multiplier stage which includes (i) a first portion that is (a) pre-charged during a first clock phase and (b) pumped during a second clock phase, and (ii) a second portion that is (a) pumped during the first clock phase and (b) pre-charged during the second clock phase. The first phase clock is provided via a regulated clock signal on signal line 38 and the second clock phase is provided via a regulated clock signal on signal line 40.

The second multiplier stage 14 includes an input 36 and an output 42. The input of the second multiplier stage is coupled to the output of the first multiplier stage, and thus both have been designated by the reference numeral 36 for simplicity. In one embodiment, second multiplier stage 14 comprises a symmetrical multiplier stage which includes (i) a first portion that is (a) pre-charged during a first clock phase and (b) pumped during a second clock phase, and (ii) a second portion that is (a) pumped during the first clock phase and (b) pre-charged during the second clock phase. The first phase clock is provided via a regulated clock signal on signal line 44 and the second clock phase is provided via a regulated clock signal on signal line 46.

The $N^{th}$ multiplier stage 16 includes an input 48 and an output 50. Output 50 of the $N^{th}$ multiplier stage 16 also represents the voltage multiplier output of voltage multiplier 10. The input of the $N^{th}$ multiplier stage is coupled to the output of a previous multiplier stage. For an embodiment including only three multiplier stages, input 48 would couple to output 42 of the second multiplier stage 14. In one embodiment, the $N^{th}$ multiplier stage 16 comprises a symmetrical multiplier stage which includes (i) a first portion that is (a) pre-charged during a first clock phase and (b) pumped during a second clock phase, and (ii) a second portion that is (a) pumped during the first clock phase and (b) pre-charged during the second clock phase. The first phase clock is provided via a regulated clock signal on signal line 52 and the second clock phase is provided via a regulated clock signal on signal line 54.

As illustrated in FIG. 1, the embodiment comprises symmetrical multiplier stages, each multiplier stage being coupled to two regulated clock circuits. That is, two regulated clock circuits are provided per multiplier stage. Each regulated clock circuit is configured to provide a given phase of the regulated clock to the corresponding multiplier stage. In addition, it should be noted that the number of regulated clock circuits used for providing a given phase of the regulated clock to one or more of the multiplier stages can be selected according to the load current requirements of a given multiplier stage or stages. If load current requirements allow, a single regulated clock circuit could be shared among one or more multiplier stages for providing a given phase of the regulated clock. In other words, there may be embodiments in which the number of regulated clock circuits for a given phase is less than the number of multiplier stages.

Input level regulator 18 includes a voltage supply input 56, a feedback bias control input 58, and a regulated voltage output on signal line 34. Input level regulator 18 advantageously enables regulation of a voltage to a range of voltage levels, the range of voltage levels including levels equal to the supply voltage ($=V_{SUPPLY}$) and lower than the supply voltage ($<V_{SUPPLY}$). In one embodiment, input level regulator 18 is configured to provide a regulated voltage on signal line 34 in response to the supply voltage on input 56 and the feedback bias control signal on signal line 58, as will be discussed further herein.

Regulated clock circuit 20 comprises a supply voltage clock (CLK) input, a supply voltage ($V_{SUPPLY}$) input, an input for receiving a feedback bias control signal 58, and a regulated clock output on signal line 38. In one embodiment, the regulated clock output on signal line 38 comprises a first phase clock of the regulated clock signal. Regulated clock circuit 22 comprises a clock (CLK) input, a supply voltage ($V_{SUPPLY}$) input, an input for receiving a feedback bias control signal 58, and a regulated clock output on signal line 40. In one embodiment, the regulated clock output on signal line 40 comprises a second phase clock of the regulated clock signal. For regulated clock circuits 20 and 22, the CLK input has a peak level at $V_{SUPPLY}$.

Regulated clock circuit 24 comprises a supply voltage clock (CLK) input, a supply voltage ($V_{SUPPLY}$) input, an input for receiving a feedback bias control signal 58, and a regulated clock output on signal line 44. In one embodiment, the regulated clock output on signal line 44 comprises a first phase clock of the regulated clock signal. Regulated clock circuit 26 comprises a supply voltage clock (CLK) input, a supply voltage ($V_{SUPPLY}$) input, an input for receiving a feedback bias control signal 58, and a regulated clock output on signal line 46. In one embodiment, the regulated clock output on signal line 46 comprises a second phase clock of the regulated clock signal. For regulated clock circuits 24 and 26, the CLK input has a peak level at $V_{SUPPLY}$.

Regulated clock circuit 28 comprises a supply voltage clock (CLK) input, a supply voltage ($V_{SUPPLY}$) input, an input for receiving a feedback bias control signal 58, and a regulated clock output on signal line 52. In one embodiment, the regulated clock output on signal line 52 comprises a first phase clock of the regulated clock signal. Regulated clock circuit 30 comprises a supply voltage clock (CLK) input, a supply voltage ($V_{SUPPLY}$) input, an input for receiving a feedback bias control signal 58, and a regulated clock output on signal line 54. In one embodiment, the regulated clock output on signal line 54 comprises a second phase clock of the regulated clock signal. For regulated clock circuits 28 and 30, the CLK input has a peak level at $V_{SUPPLY}$.

As illustrated in FIG. 1, the embodiment comprises symmetrical multiplier stages, each multiplier stage being coupled to two regulated clock circuits. That is, two regulated clock circuits are provided per multiplier stage. In addition, it should be noted that the number of regulated clock circuits used for providing a given phase of the regulated clock to one or more of the multiplier stages can be selected according to the requirements of a given the multiplier stage or stages. Furthermore, the phase provided by one regulated clock circuit of a first multiplier stage may be different from the phase provided by another regulated clock circuit of the first multiplier stage or of a second multiplier stage.

Referring still to FIG. 1, feedback bias control circuit 32 includes an input coupled to $V_{OUT}$ 50, a reference voltage input ($V_{REF}$) 60, a sampling level control input 62, and a feedback bias control output on signal line 58. Feedback bias control circuit 32 is configured for providing the feedback bias control output signal on signal line 58 in response to $V_{OUT}$ 50, reference voltage input ($V_{REF}$) 60, and sampling level control input 62. Reference voltage input ($V_{REF}$) 60 can include a variable reference voltage, wherein the variable reference voltage advantageously enables the voltage multiplier output $V_{OUT}$ 50 to have a capability for generating a greater number of different voltage output levels.

For example, feedback bias control circuit 32 can include a divider network (capacitive or resistive) to enable a given number (for example, three (3)) of sample ratio levels to be generated. Assuming, $V_{REF}$ is variable between a number of reference voltage levels (for example, four (4)), then the total number of output levels for $V_{OUT}$ will equal twelve (12, 3×4). Accordingly, the number of levels of output voltage $V_{OUT}$ 50 of voltage multiplier 10 is controlled by (i) the number of levels of reference voltage $V_{REF}$ and (ii) the number of sample ratio levels of the divider network of feedback bias control circuit 32, as will be discussed further herein. The magnitude of the output voltage $V_{OUT}$ 50 of voltage multiplier 10 is determined by the number of multiplier stages (12,14,16). Sampling level control input 62 is configured to control a sampling ratio of the divider network within the feedback control circuit 32, as will also be discussed further herein.

Figure 2:
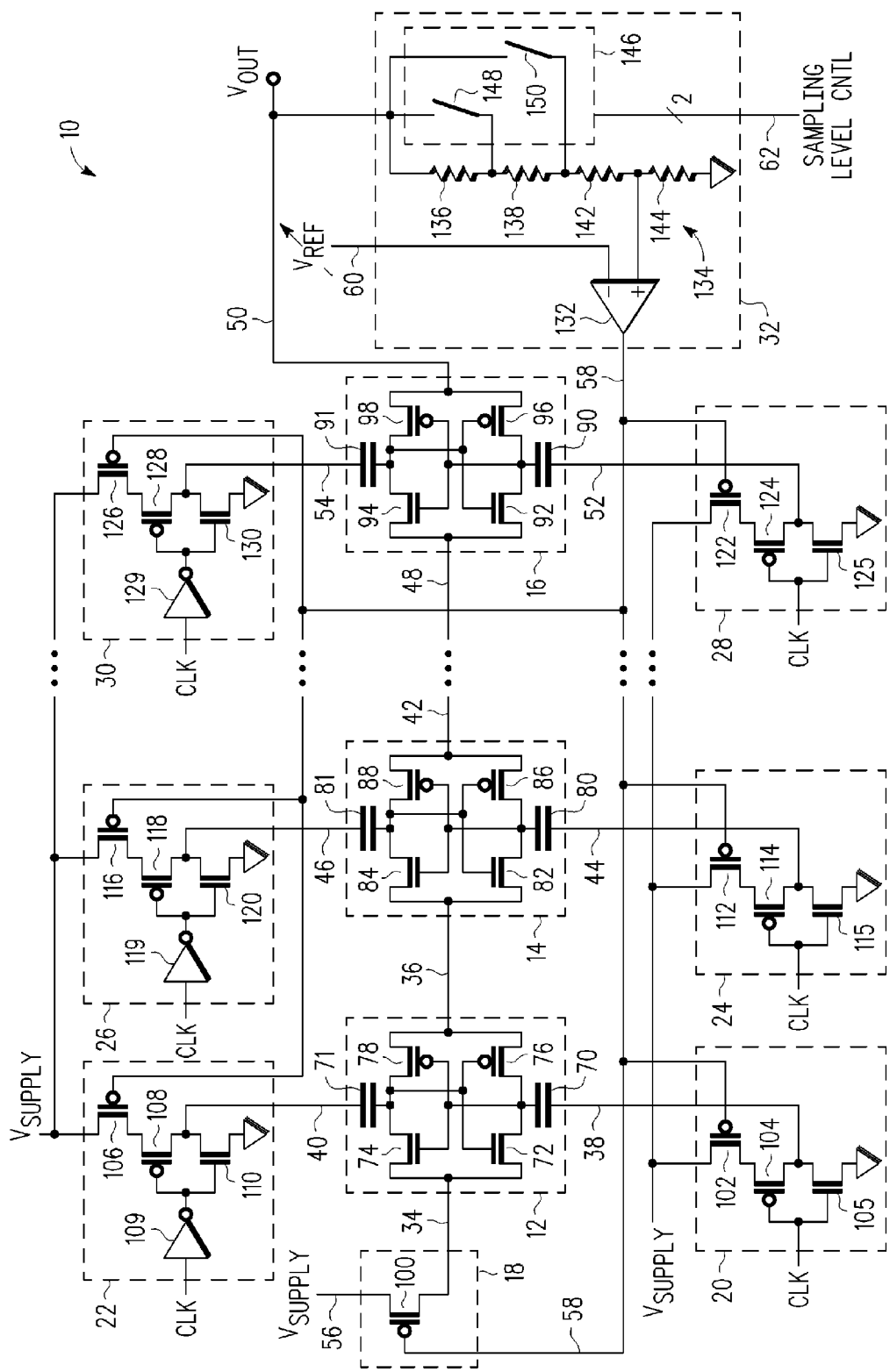
FIG. 2 is a block diagram view of a voltage multiplier according to an embodiment of the present disclosure.

FIG. 2 is a block diagram view of a voltage multiplier 10 according to an embodiment of the present disclosure. As discussed with reference to FIG. 1, the first multiplier stage 12 includes input 34 and output 36. In the embodiment as shown in FIG. 2, first multiplier stage 12 includes capacitors 70 and 71, NMOS devices 72 and 74, and PMOS devices 76 and 78, cross-coupled together in a known multiplier stage configuration. That is, an isolated $P_{WELL}$ (not shown) of NMOS devices 72 and 74 is electrically coupled to the input 34 of multiplier stage 12. In addition, an isolated $N_{WELL}$ (not shown) of PMOS devices 76 and 78 is electrically coupled to the output 36 of multiplier stage 12. Accordingly, first multiplier stage 12 comprises a symmetrical multiplier stage which includes (i) a first portion corresponding to capacitor 70 that is (a) pre-charged through NMOS device 72 during a first clock phase and (b) pumped through PMOS device 76 during a second clock phase, and (ii) a second portion corresponding to capacitor 71 that is (a) pumped through PMOS device 78 during the first clock phase and (b) pre-charged through NMOS device 74 during the second clock phase. The first phase clock is provided via regulated clock signal on signal line 38 and the second clock phase is provided via a regulated clock signal on signal line 40.

Multiplier stages 14 and 16 are similar to multiplier stage 12. That is, multiplier stages 14 and 16 include corresponding capacitors (80,90) and (81,91), NMOS devices (82,92) and (84,94), and PMOS devices (86,96) and (88,98), cross-coupled together in a known multiplier stage configuration. In addition, an isolated $P_{WELL}$ (not shown) of NMOS devices (82,92) and (84,94) are electrically coupled to the corresponding multiplier inputs 36 and 48 of a corresponding multiplier stage. The isolated $P_{WELL}$ (not shown) of NMOS devices are isolated Deep $N_{WELL}$ (not shown) and it is coupled to the output of their stages 42 and 50 respectively. In addition, an $N_{WELL}$ (not shown) of PMOS devices (86,96) and (88,98) are electrically coupled to the corresponding outputs 42 and 50 of a corresponding multiplier stage. Furthermore, multiplier stages 14 and 16 operate in a similar manner as multiplier stage 12, and thus not described in further detail herein.

As discussed with reference to FIG. 1, input level regulator 18 includes a voltage supply input 56, a feedback bias control input 58, and a regulated voltage output on signal line 34. As shown in FIG. 2, input level regulator 18 includes a PMOS device 100 configured for operating as a common-source amplifier. In such a configuration, input level regulator 18 provides a regulated voltage on signal line 34 in response to the supply voltage $V_{SUPPLY}$ on input 56 and the feedback bias control signal on signal line 58.

With reference still to FIG. 2, in one embodiment, regulated clock circuit 20 includes an inverter with the inverter's supply being regulated by a common source amplifier. The inverter comprises PMOS device 104 and NMOS device 105. The common-source amplifier comprises PMOS device 102. Regulated clock circuit 20 operates in response to the clock (CLK), the supply voltage ($V_{SUPPLY}$), and the feedback bias control signal 58 for outputting the regulated clock output on signal line 38. In one embodiment, the regulated clock output on signal line 38 comprises a first phase clock of the regulated clock signal.

Regulated clock circuit 22 includes first and second inverters, wherein the second inverter's supply is regulated by a common source amplifier. The first inverter 109 supply is characterized by a peak level that is the same as the clock (CLK) input. The second inverter comprises PMOS device 108 and NMOS device 110. The common-source amplifier comprises PMOS device 106. Regulated clock circuit 22 operates in response to the clock (CLK), the supply voltage ($V_{SUPPLY}$), and the feedback bias control signal 58 for outputting the regulated clock output on signal line 40. In one embodiment, the regulated clock output on signal line 40 comprises the second phase clock of the regulated clock signal.

Regulated clock circuits (24,28) and (26,30) are similar to regulated clock circuits 20 and 22, respectively. That is, regulated clock circuits (24,28) include corresponding components, in particular, an inverter comprising PMOS device (114,124) and NMOS device (115,125) and a common-source amplifier comprising PMOS device (112,122), respectively, coupled together in similar configurations as in regulated clock circuit 20. Regulated clock circuits (26,30) include corresponding components, in particular, a first inverter (119,129, a second inverter comprising PMOS device (118,128) and NMOS device (120,130) and a common-source amplifier comprising PMOS device (116,126), respectively, coupled together in similar configurations as in regulated clock circuit 22. In addition, regulated clock circuits (24,28) and (26,30) operate in a similar manner as does regulated clock circuits 20 and 22, respectively, and thus are not described in further detail herein.

In FIG. 2, feedback bias control circuit 32 includes an input coupled to $V_{OUT}$ 50, a reference voltage input ($V_{REF}$) 60, a sampling level control input 62, and a feedback bias control output on signal line 58. Feedback bias control circuit 32 is configured for providing the feedback bias control output signal on signal line 58 in response to $V_{OUT}$ 50, reference voltage input ($V_{REF}$) 60, and sampling level control input 62. In addition, reference voltage input ($V_{REF}$) 60 can include a variable reference voltage, wherein the variable reference voltage advantageously enables the voltage multiplier output $V_{OUT}$ 50 to have a capability for generating a greater number of different voltage output levels.

In addition, as shown in the embodiment of FIG. 2, feedback bias control circuit 32 includes a high gain amplifier 132 and a resistive divider network 134. $V_{REF}$ 60 is coupled to an inverting input of high gain operational amplifier 132 and the resistive divider network 134 is coupled to the non-inverting input of the high gain amplifier 132. The feedback bias control signal 58 is coupled to the output of the high operational gain amplifier 132. As shown, resistive divider network 134 comprises a number of resistive elements, for example, four resistive elements (136,138,142,144) coupled in series with one another. Resistive divider network 134 thus enables three (3) sample ratio levels to be generated. While only three (3) sample ratio levels are described and discussed, the embodiments of the present disclosure can include a smaller number of sample ratio levels or a greater number of sample ratio levels, according to the requirements of a given voltage multiplier application. Thus, assuming, $V_{REF}$ is variable between a number of reference voltage levels (for example, four (4)), then the total number of output levels for the feedback bias control signal 58, and thus for $V_{OUT}$, will equal twelve (12, 3×4).

Sampling level control input 62 is configured to control a sampling ratio of the divider network 134 within the feedback control circuit 32. In particular, feedback control circuit further includes switching element 146. In one embodiment, switching element 146 includes two (2) switches (148,150). The first switch 148 is normally open and coupled across resistive element 136. The second switch 150 is normally open and coupled across resistive elements 136 and 138. In one embodiment, sampling level control input 62 comprises a two bit input control signal and is configured to control activation of switching element 146, in particular first and second switches 148 and 150, respectively, for obtaining a desired sampling ratio of the divider network 134.

Accordingly, the number of levels of output voltage $V_{OUT}$ 50 of voltage multiplier 10 is controlled by (i) the number of levels of reference voltage $V_{REF}$ and (ii) the number of sample ratio levels of the divider network of feedback bias control circuit 32, per the feedback bias control signal 58. In addition, the magnitude of the output voltage $V_{OUT}$ 50 of voltage multiplier 10 is determined by the number of multiplier stages (12,14,16). Furthermore, sampling level control input 62 controls a sampling ratio of the divider network 134 within the feedback control circuit 32.

Figure 3:
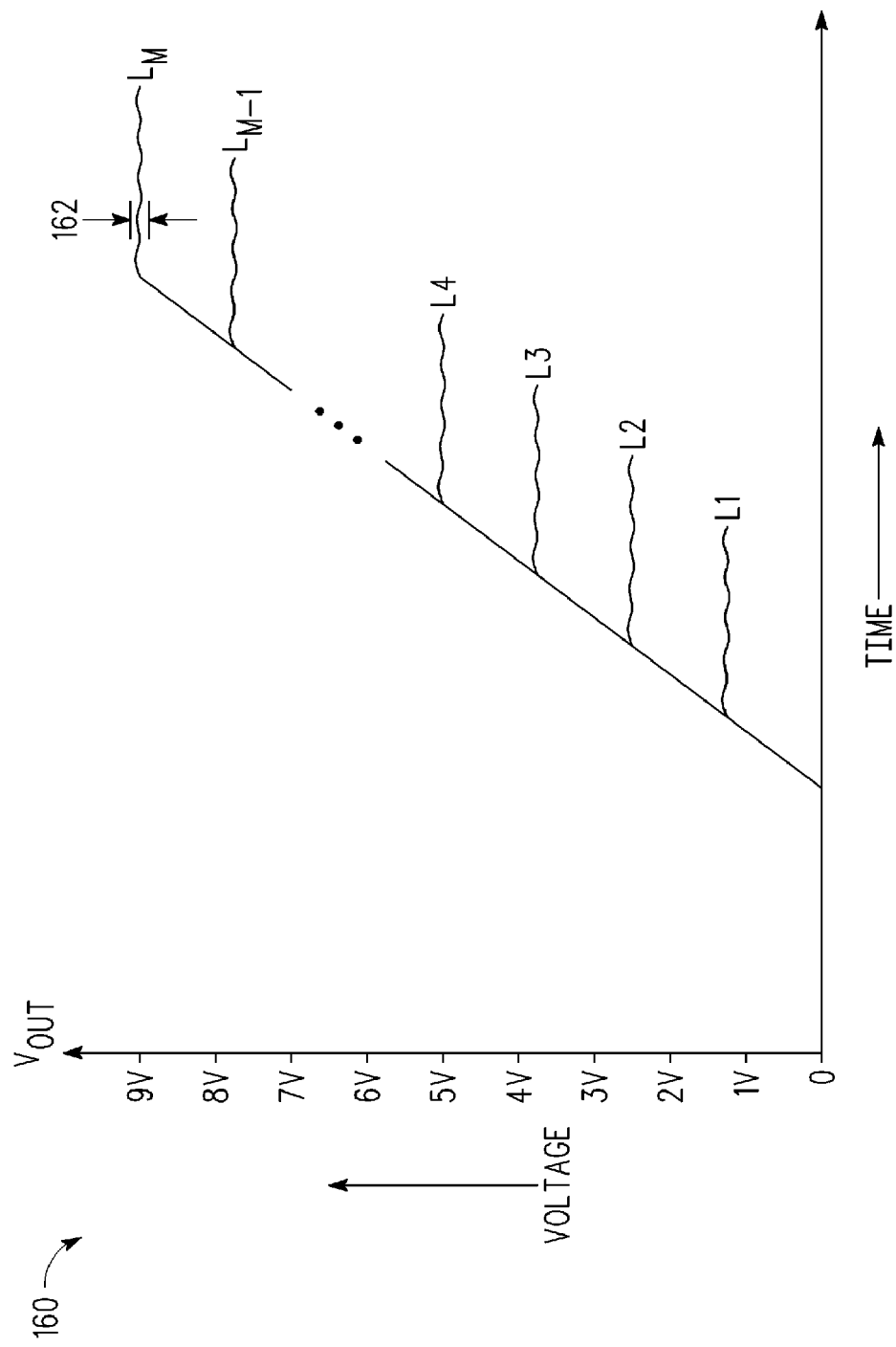
FIG. 3 is a graphical presentation view of output voltage versus time for the voltage multiplier according to the embodiments of the present disclosure.

FIG. 3 is a graphical presentation view 160 of output voltage versus time for the voltage multiplier 10 according to the embodiments of the present disclosure. Graph 160 illustrates values of output voltage $V_{OUT}$ versus time for various generated output levels L1, L2, L3, L4, . . . , $L_{M-1}$, and $L_M$, wherein M is an integer equal to the number of reference voltage levels multiplied by the number of sample ratios. In particular, graph 160 illustrates the impact of changing a sampling ratio (via sampling level control 62) and/or in conjunction using different reference voltage $V_{REF}$ (variable reference voltage 60) levels. In addition, undesirable ripple is minimal irregardless of the output voltage level being generated. One example of ripple is indicated by reference numeral 162 on level $L_M$.

Figure 4:
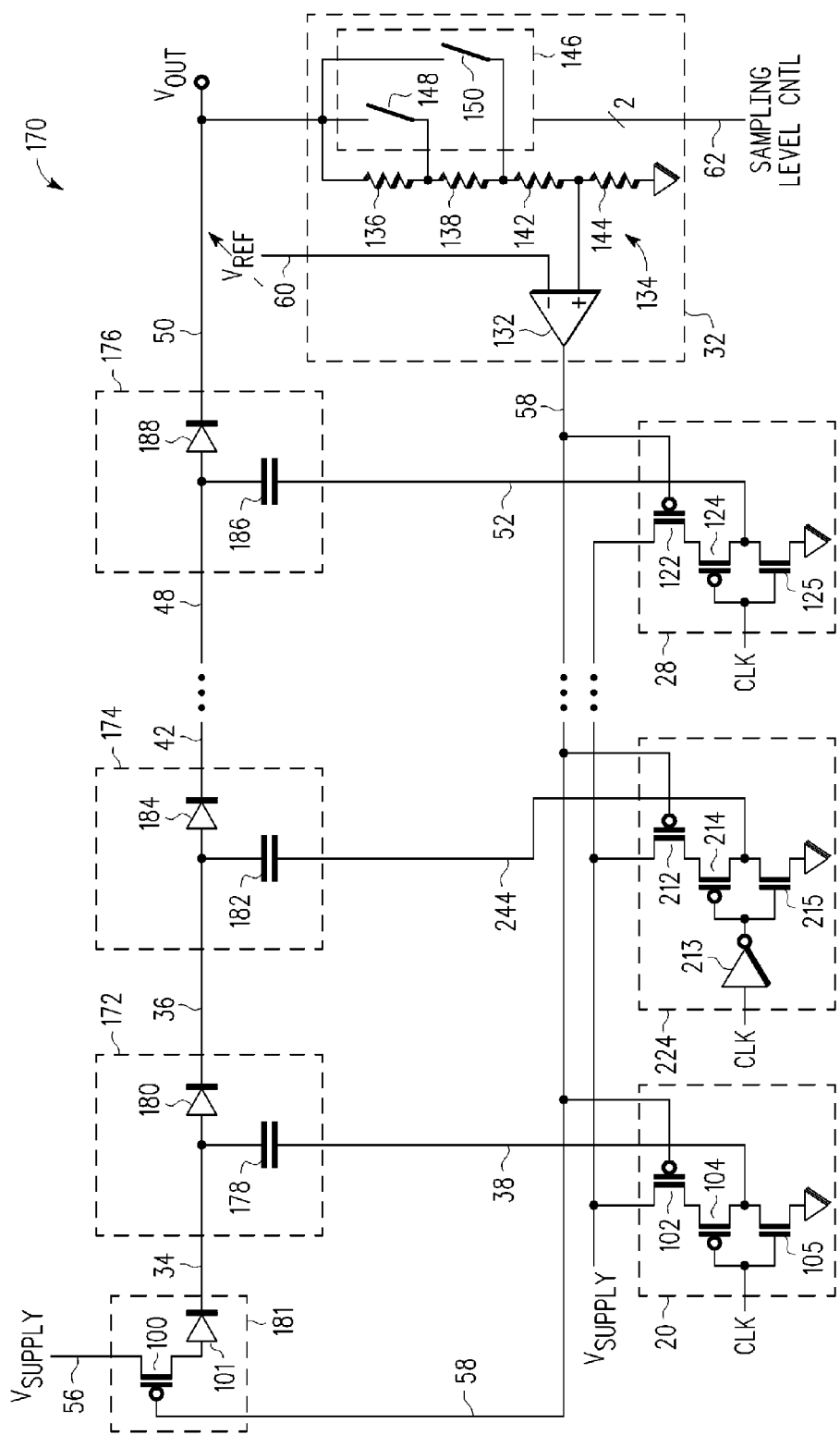
FIG. 4 is a block diagram view of a voltage multiplier according to another embodiment of the present disclosure.

FIG. 4 is a block diagram view of a voltage multiplier 170 according to another embodiment of the present disclosure. The voltage multiplier 170 of FIG. 4 is similar to voltage multiplier 10 of FIGS. 1 and 2 with differences being discussed in the following. Voltage multiplier 170 includes a number of multiplier stages, designated by reference numerals 172, 174, and 176. Voltage multiplier 170 also includes an input level regulator 181, a number of regulated clock circuits 20, 224, and 28, and a feedback bias control circuit 32.

The first multiplier stage 172 includes input 34, output 36, capacitor 178 and diode 180. In this embodiment, the first multiplier stage 172 comprises a non-symmetrical multiplier stage. In operation, capacitor 178 is (a) pre-charged during a first clock phase (e.g., provided by clock 20) and (b) pumped during a second clock phase (e.g., provided by clock 224). The first phase clock is provided via a regulated clock signal from clock circuit 20 on signal line 38. Regulated clock circuit 20 operates in response to the clock (CLK), the supply voltage ($V_{SUPPLY}$), and the feedback bias control signal 58 for outputting the regulated clock output on signal line 38. In one embodiment, the regulated clock output on signal line 38 comprises a first phase clock of the regulated clock signal.

The second multiplier stage 174 includes input 36, output 42, capacitor 182 and diode 184. In this embodiment, the second multiplier stage 174 comprises a non-symmetrical multiplier stage. In operation, capacitor 182 is (a) pre-charged during a second clock phase (e.g., provided by clock 224) and (b) pumped during a first clock phase (e.g., provided by clock 28). The second phase clock is provided via a regulated clock signal from clock circuit 224 on signal line 244. In particular, regulated clock circuit 224 includes a first inverter 213, a second inverter comprising PMOS device 214 and NMOS device 215, and a common-source amplifier comprising PMOS device 212, coupled together in similar configuration as in regulated clock circuit 22, discussed earlier herein. Regulated clock circuit 224 operates in response to the clock (CLK), the supply voltage ($V_{SUPPLY}$), and the feedback bias control signal 58 for outputting the regulated clock output on signal line 244. In one embodiment, the regulated clock output on signal line 244 comprises a second phase clock of the regulated clock signal.

The third multiplier stage 176 includes input 48, output 50 (corresponding to $V_{OUT}$), capacitor 186 and diode 188. In this embodiment, the third multiplier stage 176 comprises a non-symmetrical multiplier stage. In operation, capacitor 186 is (a) pre-charged during a first clock phase and (b) pumped during a second clock phase. The first phase clock is provided via a regulated clock signal from clock circuit 28 on signal line 52. Regulated clock circuit 28 operates, as discussed earlier herein, in response to the clock (CLK), the supply voltage ($V_{SUPPLY}$), and the feedback bias control signal 58 for outputting the regulated clock output on signal line 52. In one embodiment, the regulated clock output on signal line 52 comprises a first phase clock of the regulated clock signal.

With reference still to FIG. 4, input level regulator 181 includes a voltage supply input 56, a feedback bias control input 58, diode 101, and a regulated voltage output on signal line 34. Input level regulator 181 includes a PMOS device 100 configured for operating as a common-source amplifier. In such a configuration, input level regulator 181 provides a regulated voltage on signal line 34 through diode 101 in response to the supply voltage $V_{SUPPLY}$ on input 56 and the feedback bias control signal on signal line 58. Diode 101 functions to prevent reverse current flow during pumping (i.e., the second clock phase) of the first multiplier stage 174.

By now it should be appreciated that there has been provided a voltage multiplier comprising: a first clocked multiplier stage having an input and an output; a second clocked multiplier stage having an input and an output; an input level regulator coupled to the input of the first multiplier stage; and a feedback bias control circuit coupled to the input level regulator. The feedback bias control circuit is further coupled to receive the output of the second multiplier stage, wherein the feedback bias control circuit generates a feedback signal affecting an output of the input level regulator based on a comparison between a voltage proportional to a voltage at the output of the second clocked multiplier stage and a reference voltage.

In one embodiment, the feedback bias control circuit is further coupled to a generator of a clock coupled to the first clocked multiplier stage, such that the feedback signal affects a magnitude of the clock coupled to the first clocked multiplier stage. In another embodiment, the feedback bias control circuit is further coupled to a generator of a clock coupled to the second clocked multiplier stage, such that the feedback signal affects a magnitude of the clock coupled to the second clocked multiplier stage. In yet another embodiment, the first clocked multiplier stage is identical to the second clocked multiplier stage. In a still further embodiment, the first clocked multiplier stage is different from the second clocked multiplier stage.

In another embodiment, the feedback bias control circuit comprises one of a switched resistor-divider or a switched capacitor-divider to generate the voltage proportional to the voltage at the output of the second clocked multiplier stage. The feedback bias control circuit further comprises an operational amplifier for comparing the voltage proportional to the voltage at the output of the second clocked multiplier stage and the reference voltage. The one of the switched resistor-divider and the switched-capacitor divider is configured to dynamically change a value of the voltage proportional to the voltage at the output of the second clocked multiplier stage in response to at least one control signal.

According to one embodiment of the present disclosure, a voltage multiplier comprises: a first clocked multiplier stage having an input and an output; a second clocked multiplier stage having an input and an output, wherein the output of the first clocked multiplier stage is coupled to the input of the second multiplier stage; a first regulated clock coupled to the first control input of the first multiplier stage; a second regulated clock coupled to the second control input of the first multiplier stage; a third regulated clock coupled to the first control input of the second multiplier stage; a fourth regulated clock coupled to the second control input of the second multiplier stage; a feedback bias control circuit coupled to the input level regulator, wherein the feedback bias control circuit is further coupled to receive the output of the second multiplier stage, and wherein the feedback bias control circuit generates a feedback signal affecting an output of the input level regulator based on a comparison between a voltage proportional to a voltage at the output of the second clocked multiplier stage and a reference voltage, wherein the feedback bias control circuit is further coupled to the first regulated clock, such that the feedback signal affects an output voltage of the first regulated clock, wherein the feedback bias control circuit is further coupled to the second regulated clock, such that the feedback signal affects an output voltage of the second regulated clock, wherein the feedback bias control circuit is further coupled to the third regulated clock, such that the feedback signal affects an output voltage of the third regulated clock, and feedback bias control circuit is further coupled to the fourth regulated clock, such that the feedback signal affects an output voltage of the fourth regulated clock. In another embodiment, the first clocked multiplier stage is identical to the second clocked multiplier stage. In still another embodiment, the first clocked multiplier stage is different from the second clocked multiplier stage. In a yet further embodiment, each of the first clocked multiplier stage and the second clocked multiplier stage comprises a pair of cross-coupled transistors and two pumping capacitors.

In one embodiment, the feedback bias control circuit comprises one of a switched resistor-divider or a switched capacitor-divider to generate the voltage proportional to the voltage at the output of the second multiplier stage. The feedback bias control circuit further comprises an operational amplifier for comparing the voltage proportional to the voltage at the output of the second clocked multiplier stage and the reference voltage. In addition, the one of the switched resistor-divider or the switched-capacitor divider is configured to dynamically change a value of the voltage proportional to the voltage at the output of the second clocked multiplier stage in response to at least one control signal.

According to another embodiment, a voltage multiplier comprises a first clocked multiplier stage having an input, a control input, and an output; a second clocked multiplier stage having an input, a control input, and an output, wherein the output of the first clocked multiplier stage is coupled to the input of the second multiplier stage; a first regulated clock coupled to the control input of the first multiplier stage; a second regulated clock coupled to the control input of the second multiplier stage; an input level regulator, wherein the input level regulator comprises a transistor having a first current electrode coupled to a supply voltage, a second current electrode coupled to the input of the first multiplier stage, and a control electrode coupled to receive a feedback signal; and a feedback bias control circuit coupled to provide the feedback signal to the control electrode of the transistor. The feedback bias control circuit is further coupled to receive the output of the second multiplier stage, and wherein the feedback bias control circuit generates the feedback signal affecting an output of the input level regulator based on a comparison between a voltage proportional to a voltage at the output of the second clocked multiplier stage and a reference voltage.

In another embodiment, the feedback bias control circuit is further coupled to the first regulated clock and the second regulated clock, such that the feedback signal affects an output voltage of the first regulated clock and an output voltage of the second regulated clock. In yet another embodiment, the feedback bias control circuit comprises one of a switched resistor-divider or a switched capacitor-divider to generate the voltage proportional to the voltage at the output of the second clocked multiplier stage. In a still further embodiment, each of the first clocked multiplier stage and the second clocked multiplier stage comprises a diode and a pumping capacitor.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Although the invention is described herein with reference to specific embodiments, various modifications and changes can be made without departing from the scope of the present invention as set forth in the claims below. For example, the embodiments of the present disclosure can be advantageously applied to MRAM devices, Embedded NVM devices, Embedded SRAM devices, and the like. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A voltage multiplier comprising:
    a first clocked multiplier stage having an input and an output;
    a second clocked multiplier stage having an input and an output;
    an input level regulator having an input coupled to receive a supply voltage, a control input, and an output coupled to the input of the first multiplier stage; and
    a feedback bias control circuit coupled to the control input of the input level regulator, wherein the feedback bias control circuit is further coupled to receive the output of the second multiplier stage, and wherein the feedback bias control circuit generates a feedback signal for regulating an output voltage at the output of the input level regulator to a continuous range of voltage levels based on a comparison between a voltage proportional to a voltage at the output of the second clocked multiplier stage and a reference voltage.

2. The voltage multiplier of claim 1, wherein the feedback bias control circuit is further coupled to a generator of a clock coupled to the first clocked multiplier stage, such that the feedback signal affects a magnitude of the clock coupled to the first clocked multiplier stage.

3. The voltage multiplier of claim 1, wherein the feedback bias control circuit is further coupled to a generator of a clock coupled to the second clocked multiplier stage, such that the feedback signal affects a magnitude of the clock coupled to the second clocked multiplier stage.

4. The voltage multiplier of claim 1, wherein the feedback bias control circuit comprises one of a switched resistor-divider or a switched capacitor-divider to generate the voltage proportional to the voltage at the output of the second clocked multiplier stage.

5. The voltage multiplier of claim 4, wherein the feedback bias control circuit further comprises an operational amplifier for comparing the voltage proportional to the voltage at the output of the second clocked multiplier stage and the reference voltage.

6. The voltage multiplier of claim 4, wherein the one of the switched resistor-divider and the switched-capacitor divider is configured to dynamically change a value of the voltage proportional to the voltage at the output of the second clocked multiplier stage in response to at least one control signal.

7. The voltage multiplier of claim 1, wherein the first clocked multiplier stage is identical to the second clocked multiplier stage.

8. The voltage multiplier of claim 1, wherein the first clocked multiplier stage is different from the second clocked multiplier stage.

9. A voltage multiplier comprising:
a first clocked multiplier stage having an input and an output;
a second clocked multiplier stage having an input and an output, wherein the output of the first clocked multiplier stage is coupled to the input of the second multiplier stage;
an input level regulator having an input for receiving a supply voltage, an output coupled to provide an output voltage to the input of the first clocked multiplier stage, and a control input;
a first regulated clock coupled to a first control input of the first multiplier stage;
a second regulated clock coupled to a second control input of the first multiplier stage;
a third regulated clock coupled to a first control input of the second multiplier stage;
a fourth regulated clock coupled to a second control input of the second multiplier stage;
a feedback bias control circuit coupled to the control input of the input level regulator, wherein the feedback bias control circuit is further coupled to receive the output of the second multiplier stage, and wherein the feedback bias control circuit generates a feedback signal for regulating the output voltage of the input level regulator to a continuous range of voltage levels based on a comparison between a voltage proportional to a voltage at the output of the second clocked multiplier stage and a reference voltage, wherein the feedback bias control circuit is further coupled to the first regulated clock, such that the feedback signal affects an output voltage of the first regulated clock, wherein the feedback bias control circuit is further coupled to the second regulated clock, such that the feedback signal affects an output voltage of the second regulated clock, wherein the feedback bias control circuit is further coupled to the third regulated clock, such that the feedback signal affects an output voltage of the third regulated clock, and feedback bias control circuit is further coupled to the fourth regulated clock, such that the feedback signal affects an output voltage of the fourth regulated clock.

10. The voltage multiplier of claim 9, wherein the feedback bias control circuit comprises one of a switched resistor-divider or a switched capacitor-divider to generate the voltage proportional to the voltage at the output of the second multiplier stage.

11. The voltage multiplier of claim 10, wherein the feedback bias control circuit further comprises an operational amplifier for comparing the voltage proportional to the voltage at the output of the second clocked multiplier stage and the reference voltage.

12. The voltage multiplier of claim 10, wherein the one of the switched resistor-divider or the switched-capacitor divider is configured to dynamically change a value of the voltage proportional to the voltage at the output of the second clocked multiplier stage in response to at least one control signal.

13. The voltage multiplier of claim 9, wherein the first clocked multiplier stage is identical to the second clocked multiplier stage.

14. The voltage multiplier of claim 9, wherein the first clocked multiplier stage is different from the second clocked multiplier stage.

15. The voltage multiplier of claim 9, wherein each of the first clocked multiplier stage and the second clocked multiplier stage comprises a pair of cross-coupled transistors and two pumping capacitors.

16. A voltage multiplier comprising:
a first clocked multiplier stage having an input, a control input, and an output;
a second clocked multiplier stage having an input, a control input, and an output, wherein the output of the first clocked multiplier stage is coupled to the input of the second multiplier stage;
a first regulated clock coupled to the control input of the first clocked multiplier stage;
a second regulated clock coupled to the control input of the second clocked multiplier stage;
an input level regulator, wherein the input level regulator comprises a transistor having a first current electrode coupled to receive a supply voltage, a second current electrode coupled to the input of the first clocked multiplier stage, and a control electrode coupled to receive a feedback signal; and
a feedback bias control circuit coupled to provide the feedback signal to the control electrode of the transistor, wherein the feedback bias control circuit is further coupled to receive the output of the second clocked multiplier stage, and wherein the feedback bias control circuit generates the feedback signal for regulating an output voltage of the input level regulator to a continuous range of voltage levels based on a comparison between a voltage proportional to a voltage at the output of the second clocked multiplier stage and a reference voltage.

17. The voltage multiplier of claim 16, wherein the feedback bias control circuit is further coupled to the first regulated clock and the second regulated clock, such that the feedback signal affects an output voltage of the first regulated clock and an output voltage of the second regulated clock.

18. The voltage multiplier of claim 16, wherein the feedback bias control circuit comprises one of a switched resistor-divider or a switched capacitor-divider to generate the voltage proportional to the voltage at the output of the second clocked multiplier stage.

19. The voltage multiplier of claim 16, wherein each of the first clocked multiplier stage and the second clocked multiplier stage comprises a diode and a pumping capacitor.

* * * * *